L. MENDEZ.
COOKING DEVICE.
APPLICATION FILED DEC. 28, 1912.
1,076,383.
Patented Oct. 21, 1913.
2 SHEETS—SHEET 1.
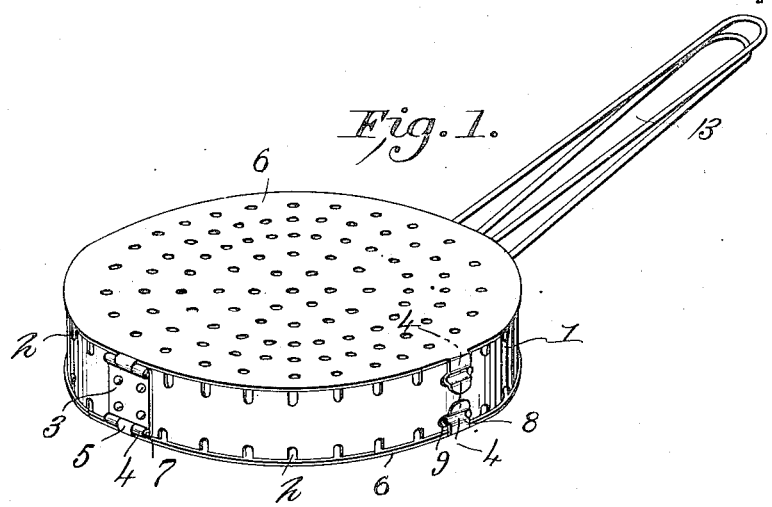
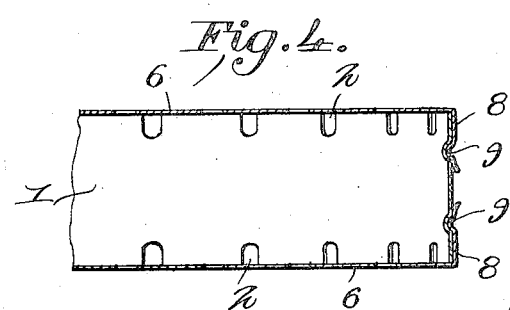
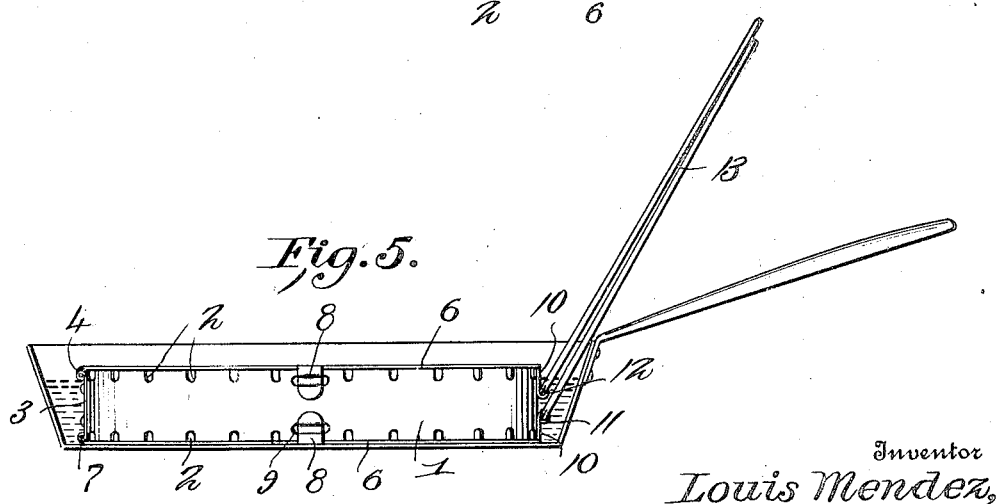
Witnesses
Inventor
Louis Mendez,
By Victor J. Evans
Attorney

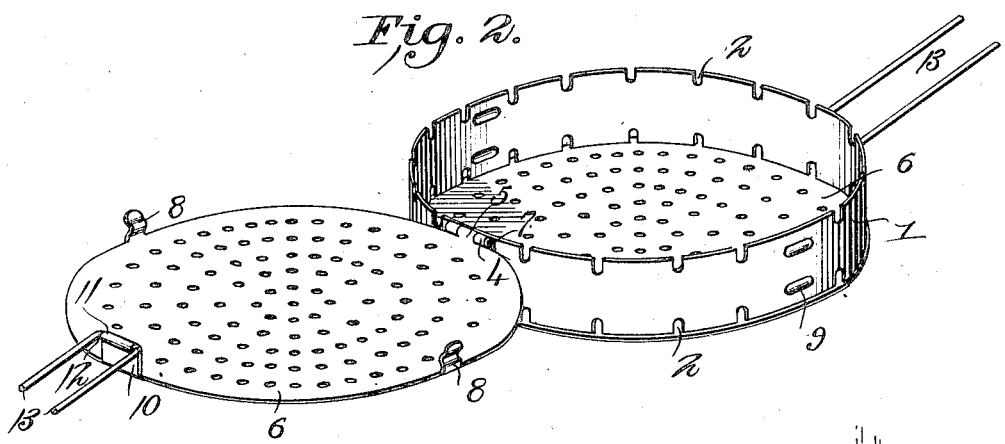
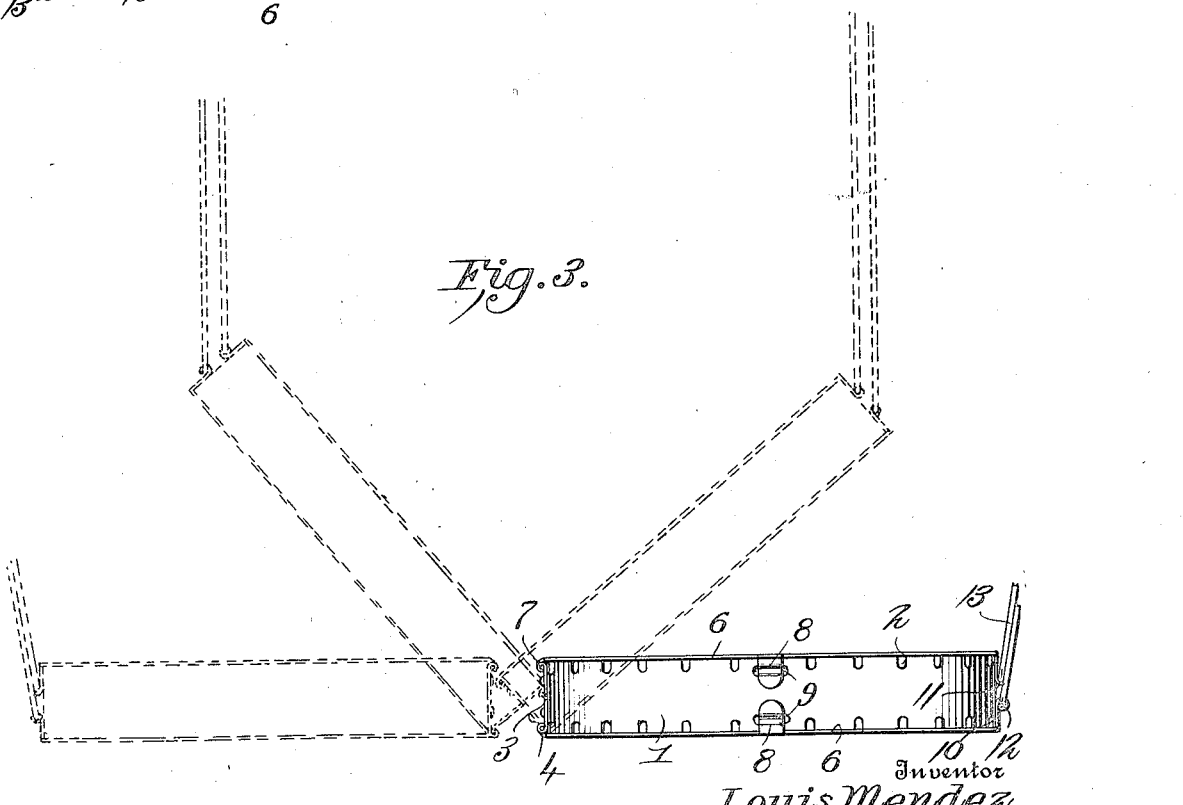

UNITED STATES PATENT OFFICE.

LOUIS MENDEZ, OF YONKERS, NEW YORK.

COOKING DEVICE.

1,076,383.   Specification of Letters Patent.   Patented Oct. 21, 1913.

Application filed December 26, 1912. Serial No. 739,102.

*To all whom it may concern:*

Be it known that I, LOUIS MENDEZ, a citizen of the United States, residing at Yonkers, in the county of Westchester and State of New York, have invented new and useful Improvements in Cooking Devices, of which the following is a specification.

This invention relates to cooking devices and particularly to a utensil designed for use in connection with frying pans or like kitchen articles, and it has for its primary object the provision of a foraminous receptacle which can be immerged in a body of grease and which will be designed to accommodate articles of food, such as fish, potatoes, steak or the like which should be thoroughly cooked upon both sides.

Another object of the invention is the provision of a device of this character which will facilitate the turning of the food articles during the frying or baking operation.

Another object of the invention is to provide a device of this character which will include adjustable portions which may be relatively separated so as to permit the cooked articles to be readily removed.

Another object of the invention is the provision of a device of this character wherein certain sections thereof can be conveniently adjusted initially to form a tray-like body so as to accommodate the food article before the device is placed in the frying grease.

Another object of the invention is to provide a device of this character which will include swinging handle portions that may be manipulated without necessitating an entire removal of the device from the cooking utensil during the turning operation.

Another object of the invention is the provision of a device of this character which will hold the articles out of direct contact with the grease container and thereby eliminate any burning of the articles during the cooking operation.

With these and other objects in view, the invention consists of certain novel features of construction, combination and arrangement of parts, as will be hereinafter described and claimed.

In the accompanying drawings: Figure 1 is a perspective view of the device, showing the respective portions thereof in a closed position; Fig. 2 is a similar view, showing the device adjusted to form an initial tray portion; Fig. 3 is a diagrammatic view of the device, illustrating in dotted lines the position of the handle portions when turning the device in the frying grease of a cooking utensil; Fig. 4 is a section on line 4—4 of Fig. 1; and Fig. 5 is a section taken longitudinally through the device and illustrating the operative position thereof in a cooking utensil such as a frying pan.

The device comprises an annulus 1, which is substantially foraminous through the provision therein along both of its edges of recesses 2. At a point in the peripheral surface of the annulus is a hinge plate 3 having identically-formed knuckles 4 along its upper and lower edges, the knuckles on each edge being spaced relatively and alined and associated with knuckles 5 of foraminous flat disks or plates 6, the knuckles of the hinge plate and the knuckles of said disks receiving hinge pins 7, so that the annulus and the plates are connected for relative adjustment. The foraminous plates each have a diameter exceeding the diameter of the annulus so that the marginal edges of the foraminous plates extend slightly beyond the peripheral surface of the annulus. The said plates are each provided at diametrically opposite points with integral latch extensions 8, which are adapted under their inherent elasticity to be sprung terminally into keeper recesses 9 in the annulus. In this manner both of the plates may be positively held against swinging movements on the annulus so as to prevent the relative separation of the parts during the operation of turning the device in the grease. At the free ends the foraminous plates are provided with extensions 10 having knuckles 11 to pivotally accommodate portions 12 of handles 13. The knuckles are arranged in relatively close relation so that both handles may be collectively grasped and shifted with relation to the annulus so as to permit the device to be turned to the various positions shown diagrammatically in Fig. 3 and thereby permit the operator to readily expose both surfaces of the food articles to the effective frying action of the grease as will be apparent.

When initially placing the food articles in the device one of the foraminous plates is adjusted to an open position as shown in Fig. 2. The food articles are then placed onto the other foraminous plate where they will be wholly embraced by the annulus, the latter then serving as a guard to prevent the lateral separation of the food articles.

After the articles are placed in the device as above described, the companion foraminous plate is adjusted into locked engagement with the annulus and the device is then immerged in a body of grease, as shown in Fig. 5. The construction of the device permits the different parts thereof to be readily adjusted to positions so that the parts may be exposed in a manner to permit them to be thoroughly treated to a sterilizing or washing bath and the article thereby maintained in a highly sanitary condition.

From the foregoing description, taken in connection with the accompanying drawings, the construction and operation of the invention will be readily understood without requiring a more extended explanation.

Having thus described my invention, what I claim is:—

1. A food holder for cooking utensils comprising an annulus provided with oppositely extending U-recesses respectively opening onto the upper and lower edges of the annulus, foraminous plates closing against the opposite sides of the annulus and extending over the open ends of the recesses, and movably connected handles carried by the plates.

2. A food holder for cooking utensils comprising an annulus provided with oppositely extending circular series of U-recesses respectively open onto the upper and lower edges of the annulus, and plates hingedly mounted on the annulus and adjustable thereover so as to close the opposite sides thereof, extensions on the plates, means for holding the plates against swinging movements, and handles carried by the extensions of said plates, the extensions lying at one side of the annulus and exteriorly thereof when the plates are in closed position.

In testimony whereof I affix my signature in presence of two witnesses.

LOUIS MENDEZ.

Witnesses:
  A. M. RUSSELL,
  STIRLING LAMBERT.